(12) United States Patent
Niyogi et al.

(10) Patent No.: US 8,156,448 B2
(45) Date of Patent: Apr. 10, 2012

(54) SITE NAVIGATION AND SITE NAVIGATION DATA SOURCE

(75) Inventors: Shanku Shivabrata Niyogi, Bellevue, WA (US); Ting-Hao Yang, Kirkland, WA (US); Joseph K. Croney, Christiansted (VG); Matthew E. Gibbs, Redmond, WA (US); Stefan Schackow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 10/856,578

(22) Filed: May 28, 2004

(65) Prior Publication Data

US 2005/0278351 A1    Dec. 15, 2005

(51) Int. Cl.
*G06F 3/048* (2006.01)
(52) U.S. Cl. ......... 715/854; 715/703; 715/738; 715/853
(58) Field of Classification Search .................. 715/854, 715/703, 738, 853
See application file for complete search history.

(56) References Cited

U.S. PATENT DOCUMENTS

| | | |
|---|---|---|
| 3,937,925 A | 2/1976 | Boothroyd |
| 3,956,615 A | 5/1976 | Anderson et al. |
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,299,315 A | 3/1994 | Chin et al. |
| 5,349,657 A | 9/1994 | Lee |
| 5,388,156 A | 2/1995 | Blackledge, Jr. et al. |
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,572,643 A * | 11/1996 | Judson .......................... 709/218 |
| 5,604,908 A | 2/1997 | Mortson |
| 5,638,176 A | 6/1997 | Hobbs et al. |
| 5,640,449 A | 6/1997 | Worley et al. |
| 5,664,228 A | 9/1997 | Mital |
| 5,675,520 A | 10/1997 | Pitt, III et al. |
| 5,706,505 A | 1/1998 | Fraley et al. |

(Continued)

FOREIGN PATENT DOCUMENTS

EP      1156415      11/2001

(Continued)

OTHER PUBLICATIONS

"A Brief History of Hypertext", from Microsoft Corporation © 1996.

(Continued)

*Primary Examiner* — Weilun Lo
*Assistant Examiner* — Eric Wiener
(74) *Attorney, Agent, or Firm* — Merchant & Gould, P.C.

(57) ABSTRACT

A concept for providing hierarchical navigation information relative to one or more databases within a distributed computer system is described. In one aspect, this includes a process for hierarchically organizing bodies of information that includes: receiving a query from a user, abstracting a list of descriptors from one or more sources of information selected based on the query, organizing the list according to an hierarchy of nodes referenced in the one or more sources of information and providing information configured to facilitate displaying a graphical user interface illustrating the hierarchy and having user programmable server control classes for accession of nodes in the hierarchy.

31 Claims, 6 Drawing Sheets

U.S. PATENT DOCUMENTS

| Patent | | Date | Inventor | Ref |
|---|---|---|---|---|
| 5,732,256 | A | 3/1998 | Smith | |
| 5,732,267 | A | 3/1998 | Smith | |
| 5,745,103 | A | 4/1998 | Smith | |
| 5,748,890 | A | 5/1998 | Goldberg et al. | |
| 5,774,670 | A | 6/1998 | Montulli | |
| 5,793,982 | A | 8/1998 | Shrader et al. | |
| 5,801,702 | A * | 9/1998 | Dolan et al. | 715/854 |
| 5,802,334 | A * | 9/1998 | Nickolas et al. | 715/854 |
| 5,812,996 | A | 9/1998 | Rubin et al. | |
| 5,835,724 | A | 11/1998 | Smith | |
| 5,855,020 | A | 12/1998 | Kirsch | |
| 5,870,559 | A * | 2/1999 | Leshem et al. | 709/224 |
| 5,878,141 | A | 3/1999 | Daly et al. | |
| 5,878,282 | A | 3/1999 | Mital | |
| 5,890,172 | A * | 3/1999 | Borman et al. | 715/205 |
| 5,897,622 | A | 4/1999 | Blinn et al. | |
| 5,911,068 | A | 6/1999 | Zimmerman et al. | |
| 5,918,007 | A | 6/1999 | Blackledge, Jr. et al. | |
| 5,935,210 | A * | 8/1999 | Stark | 709/224 |
| 5,937,163 | A * | 8/1999 | Lee et al. | 709/218 |
| 5,937,419 | A * | 8/1999 | Oshiro et al. | 715/209 |
| 5,940,075 | A | 8/1999 | Mutschler, III et al. | |
| 5,940,847 | A | 8/1999 | Fein et al. | |
| 5,953,524 | A | 9/1999 | Meng et al. | |
| 5,956,489 | A | 9/1999 | San Andres et al. | |
| 5,961,601 | A | 10/1999 | Iyengar | |
| 5,963,952 | A | 10/1999 | Smith | |
| 5,983,227 | A | 11/1999 | Nazem et al. | |
| 5,991,802 | A | 11/1999 | Allard et al. | |
| 6,006,230 | A | 12/1999 | Ludwug et al. | |
| 6,014,637 | A | 1/2000 | Fell et al. | |
| 6,014,666 | A | 1/2000 | Helland et al. | |
| 6,032,207 | A | 2/2000 | Wilson | |
| 6,035,330 | A * | 3/2000 | Astiz et al. | 709/218 |
| 6,038,551 | A | 3/2000 | Barlow et al. | |
| 6,067,578 | A | 5/2000 | Zimmerman et al. | |
| 6,072,664 | A | 6/2000 | Aoyagi et al. | |
| 6,076,108 | A | 6/2000 | Courts et al. | |
| 6,101,607 | A | 8/2000 | Bachand et al. | |
| 6,108,717 | A | 8/2000 | Kimura et al. | |
| 6,115,744 | A | 9/2000 | Robins | |
| 6,121,968 | A | 9/2000 | Arcuri et al. | |
| 6,138,150 | A | 10/2000 | Nichols et al. | |
| 6,167,524 | A | 12/2000 | Goodnow et al. | |
| 6,178,461 | B1 | 1/2001 | Chan et al. | |
| 6,185,608 | B1 | 2/2001 | Hon et al. | |
| 6,199,098 | B1 * | 3/2001 | Jones et al. | 709/203 |
| 6,203,220 | B1 | 3/2001 | Takenoshita et al. | |
| 6,205,480 | B1 | 3/2001 | Broadhurst et al. | |
| 6,212,192 | B1 | 4/2001 | Mirashrafi et al. | |
| 6,218,958 | B1 | 4/2001 | Eichstaedt et al. | |
| 6,230,160 | B1 | 5/2001 | Chan et al. | |
| 6,237,006 | B1 * | 5/2001 | Weinberg et al. | 707/103 R |
| 6,246,422 | B1 | 6/2001 | Emberling et al. | |
| 6,247,044 | B1 | 6/2001 | Gosling et al. | |
| 6,253,228 | B1 | 6/2001 | Ferris et al. | |
| 6,253,234 | B1 | 6/2001 | Hunt et al. | |
| 6,279,151 | B1 | 8/2001 | Breslau et al. | |
| 6,286,133 | B1 | 9/2001 | Hopkins | |
| 6,292,188 | B1 * | 9/2001 | Carlson et al. | 715/854 |
| 6,314,424 | B1 * | 11/2001 | Kaczmarski et al. | 707/10 |
| 6,326,957 | B1 | 12/2001 | Nathan et al. | |
| 6,334,157 | B1 | 12/2001 | Oppermann et al. | |
| 6,343,148 | B2 | 1/2002 | Nagy | |
| 6,351,767 | B1 | 2/2002 | Batchelder et al. | |
| 6,353,447 | B1 | 3/2002 | Truluck et al. | |
| 6,354,477 | B1 | 3/2002 | Trummer | |
| 6,359,633 | B1 * | 3/2002 | Balasubramaniam et al. | 715/760 |
| 6,363,352 | B1 | 3/2002 | Dailey et al. | |
| 6,370,561 | B1 | 4/2002 | Allard et al. | |
| 6,373,841 | B1 | 4/2002 | Goh et al. | |
| 6,397,253 | B1 | 5/2002 | Quinlan et al. | |
| 6,401,099 | B1 | 6/2002 | Koppolu et al. | |
| 6,405,241 | B2 | 6/2002 | Gosling et al. | |
| 6,411,999 | B1 * | 6/2002 | Tinkler | 709/224 |
| 6,412,008 | B1 | 6/2002 | Fields et al. | |
| 6,430,575 | B1 | 8/2002 | Dourish et al. | |
| 6,460,071 | B1 | 10/2002 | Hoffman | |
| 6,460,141 | B1 | 10/2002 | Olden | |
| 6,463,442 | B1 | 10/2002 | Bent et al. | |
| 6,480,894 | B1 | 11/2002 | Courts et al. | |
| 6,487,665 | B1 | 11/2002 | Andrews et al. | |
| 6,505,238 | B1 | 1/2003 | Tran | |
| 6,546,516 | B1 | 4/2003 | Wright et al. | |
| 6,557,038 | B1 | 4/2003 | Becker et al. | |
| 6,560,598 | B2 | 5/2003 | Delo et al. | |
| 6,560,618 | B1 | 5/2003 | Ims | |
| 6,560,639 | B1 * | 5/2003 | Dan et al. | 709/218 |
| 6,564,251 | B2 | 5/2003 | Katariya et al. | |
| 6,591,272 | B1 | 7/2003 | Williams | |
| 6,606,418 | B2 | 8/2003 | Mitchell et al. | |
| 6,622,168 | B1 | 9/2003 | Datta | |
| 6,633,416 | B1 | 10/2003 | Benson | |
| 6,725,219 | B2 | 4/2004 | Nelson et al. | |
| 6,728,421 | B2 | 4/2004 | Kokemohr | |
| 6,957,383 | B1 * | 10/2005 | Smith | 715/207 |
| 7,246,307 | B2 * | 7/2007 | Arora et al. | 715/208 |
| 7,275,066 | B2 * | 9/2007 | Priestley | 707/103 R |
| 7,296,222 | B1 * | 11/2007 | Sakairi | 707/E17.118 |
| 7,373,612 | B2 * | 5/2008 | Risch et al. | 715/850 |
| 7,428,725 | B2 * | 9/2008 | Niyogi et al. | 717/109 |
| 2001/0054020 | A1 | 12/2001 | Barth et al. | |
| 2002/0004815 | A1 | 1/2002 | Muhlestein et al. | |
| 2002/0008703 | A1 | 1/2002 | Merrill et al. | |
| 2002/0083171 | A1 | 6/2002 | Hoogenboom et al. | |
| 2002/0108102 | A1 | 8/2002 | Muhlestein et al. | |
| 2002/0188890 | A1 | 12/2002 | Shupps et al. | |
| 2003/0009476 | A1 | 1/2003 | Fomenko et al. | |
| 2003/0009519 | A1 | 1/2003 | Gosling et al. | |
| 2003/0009567 | A1 | 1/2003 | Farouk | |
| 2003/0018827 | A1 | 1/2003 | Guthrie et al. | |
| 2003/0025728 | A1 | 2/2003 | Ebbo et al. | |
| 2003/0028565 | A1 | 2/2003 | Landsman et al. | |
| 2003/0074634 | A1 | 4/2003 | Emmelmann | |
| 2003/0097639 | A1 | 5/2003 | Niyogi et al. | |
| 2004/0003112 | A1 | 1/2004 | Alles et al. | |
| 2004/0003139 | A1 | 1/2004 | Cottrille et al. | |
| 2004/0003248 | A1 | 1/2004 | Arkhipov | |
| 2004/0073873 | A1 | 4/2004 | Croney et al. | |

FOREIGN PATENT DOCUMENTS

| | | |
|---|---|---|
| EP | 1156427 | 11/2001 |
| EP | 1156428 | 11/2001 |
| EP | 1164473 | 12/2001 |
| EP | 01111680.3-2201 | 4/2002 |
| EP | 01111681.1-2201 | 4/2002 |
| WO | WO 98/21651 | 5/1998 |
| WO | WO 98/44695 | 10/1998 |
| WO | WO 99/34288 | 7/1999 |

OTHER PUBLICATIONS

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996.

"HTML Encyclopaedia"; http://www.scit.wlv.ac.uk/encyc/form.html; 2 pages.

"HTTP Made Really Easy—A Practical Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73.

Article, ColdFusion Web Application Server, update and summary, from Allaire Corp—www@allaire.com.

Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, R., "Data Binding in Dynamic HTML," DBMS MAG, 'Online! Mar. 1998 (1983-03) pp. 47-52.

Dowd, Tyson et al., "Compiling Mercury to the .NET Common Language Runtime," Electronic Notes in Theoretical Computer Sciences 59 No. 1 (Netherlands) (2001), pp. 1-16.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond.

Hammock(TM), Think of it as Swing(TM) for the Web (10 pages).

Hannay, Phillip et al., "MSIL for the .NET Framework: The Next Battleground?", Virus Bulletin Conference, Sep. 2001, pp. 173-196.

Holmes, John W.; e-Mail response to question regarding GET/POST. HTTP request, extracted from Google's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management,"Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. and Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001, p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

OOP Launches Hammock at JavaOne (1 page).

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Irian; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http:www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shapiro, M., "A Binding Protocol for Distributed Shared Objects," Proceedings of the International Conference on Distributed Computing Systems, Poznan, Poland, Jun. 21-24, 1994, Los Alamitos, IEEE Comp. Soc. Press.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Stewart, Tony: "The Document as Application: Issues and Implications" GCA XML Europe 1999; pp. 575-599.

Syme, Don, "ILX: Extending the .NET Common IL for Functional Language Interoperability," Electronic Notes in Theoretical Computer Science 59 No. 1, (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

* cited by examiner

SITE NAVIGATION AND SITE NAVIGATION DATA SOURCE

TECHNICAL FIELD

This disclosure relates to navigation systems applicable to datastores, processes and apparatus for datastore navigation, datastore navigation in distributed computer systems and more particularly to multiple user dynamic distributed computer-based datastore navigation systems.

BACKGROUND

Computer systems have evolved significantly during the last century. Starting from relatively slow electromechanical data manipulation devices employed primarily by large businesses, present-day computer systems include a broad gamut of markedly higher-speed computation devices ranging from massively parallel processing systems to highly agile, portable and interconnectable multiple-function computation engines enjoying far broader distribution and a markedly richer ensemble of applications.

One consequence of the dramatic expansion of computer systems has been the advent of distributed computer systems for information dispersal, promoting commercial interactions and the like, via media such as the Internet (aka "Web"). The initial ARPAnet data exchange typically was limited to brief textual messaging, and this information exchange modality was initially developed to facilitate robust data/information exchange, even in light of severe infrastructural damage, such as might be associated with a natural or man-made disaster.

However, the resultant Internet communication mode is presently capable of handling huge amounts of data with great efficiency and of providing a rich variety of multimedia information. Additionally, it is more convenient, in many ways, than some other communications tools, at least in part because the user has a greater degree of flexibility in choosing when to interact with the system and thus with another party's information.

This is coupled with the convenience of a high probability of extremely rapid access to content (e.g., a datastore or website), even when the user is many thousands of miles away from the content provider. It is also often associated with fixed service price (i.e., no incremental per-message costs), color image as well as motion picture and mixed-media messaging transmission capabilities, providing an attractive ensemble of features for many situations. As a result, protocols were developed that presently provide efficient access to an often near-real-time communications exchange medium supportive of a broad gamut of multimedia information, typically via a graphical user interface or GUI.

However, as a result, website developers frequently require the ability to access and display website navigation information. Traditionally, this need has been fulfilled with ad-hoc solutions including: shipping navigation data via a query-string; storing navigation data in closed, non-extensible file formats; and custom coding. Traditionally, site navigation is addressed in unique and site-specific ways using custom code developed independently for each web site. There is no one standard approach for storing, retrieving and displaying site navigation data. As a result, these types of solutions suffer from the following shortcomings:

Code that consumes website navigation data is tightly coupled with or highly dependent on the storage format of this data;

Websites consume non-portable navigation data. Pages and controls that are copied across different website implementations need to be re-tooled to accommodate different website navigation implementations; and Even when a website developer has the foresight to centralize web site navigation data logic, the benefits of code re-use are limited to that developer's sphere of influence.

There are thus increasing needs for methods and apparatus for increasing flexibility of applications for scalable computer systems and providing performance improvements.

SUMMARY

In one aspect, the present disclosure describes a process for hierarchically organizing bodies of information. The process includes receiving a query from a user, abstracting a table of contents from one or more datastores selected based on the query, organizing the table of contents according to an hierarchy of nodes referenced in the one or more datastores and providing information configured to facilitate displaying a graphical user interface illustrating the hierarchy and having user controls for accession and/or traversal of nodes in the hierarchy.

BRIEF DESCRIPTION OF THE CONTENTS

Figure 4A:
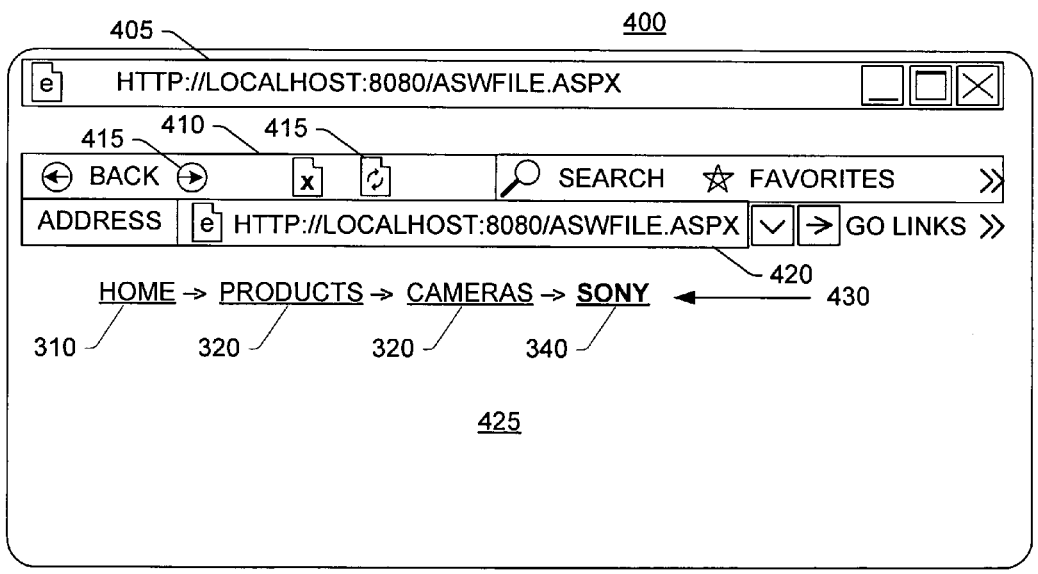
Figures 4B, 5:
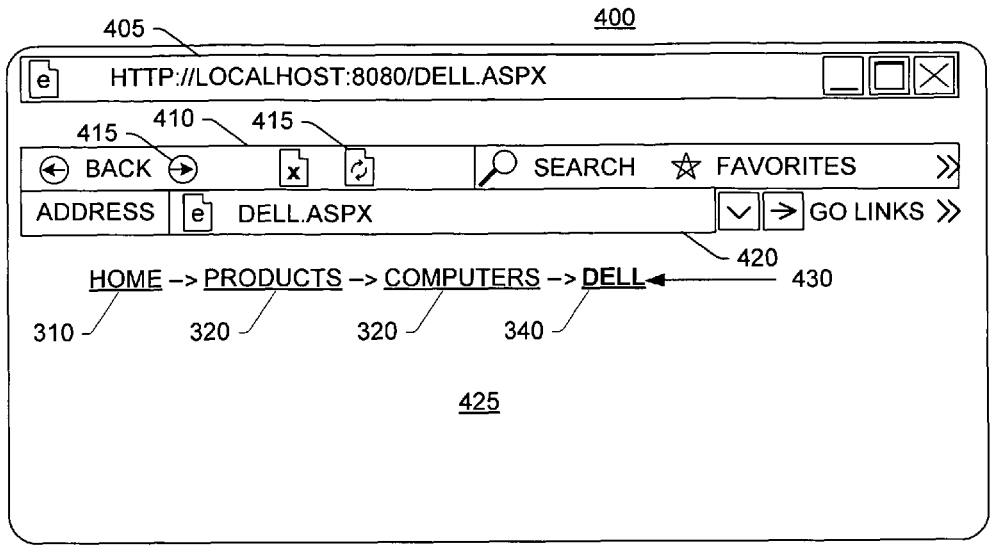

FIGS. 4A and 4B provide an exemplary views of web page graphical user interfaces or GUIs useful with the concepts of the present disclosure.

FIG. 5 shows an example of a web page graphical user interface or GUI rendered via the approach of Example E.3.

Figure 6:
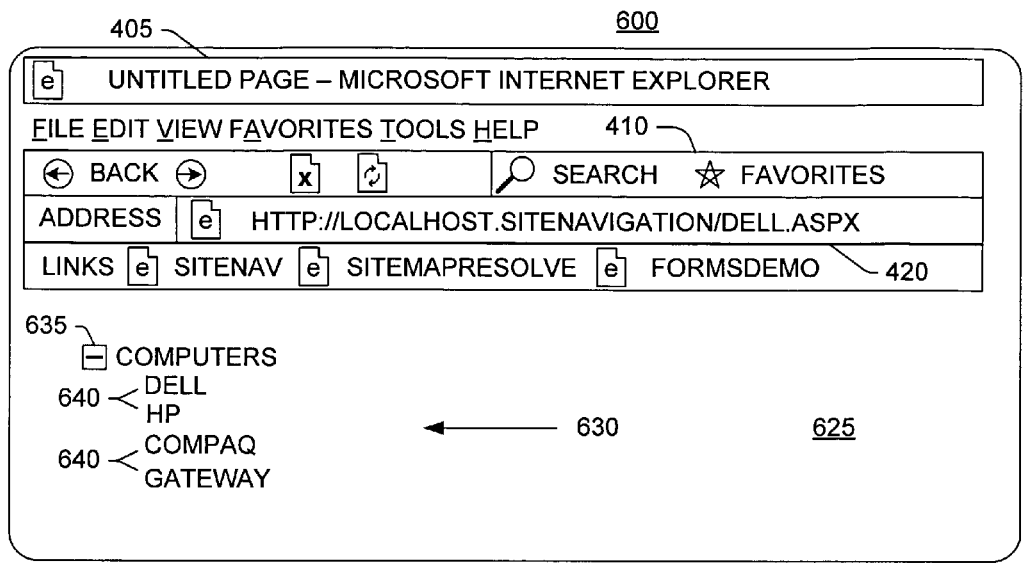

FIG. 6 shows an example of a web page GUI rendered via the approach of Example E.4.

Figure 7:
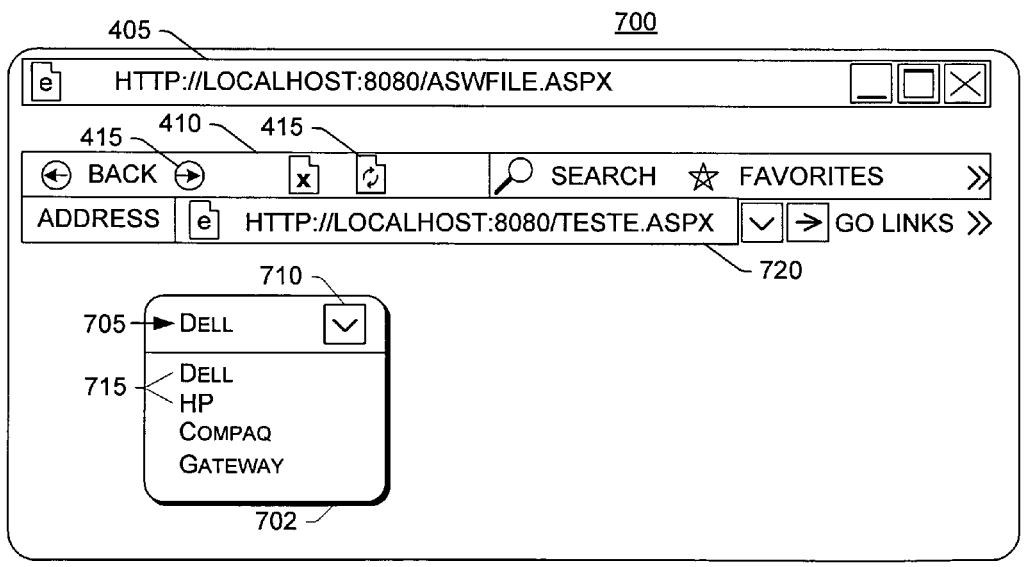

FIG. 7 provides an exemplary view of a web page graphical user interface or GUI useful with the concepts of the present disclosure that includes a vertical scroll bar.

Figure 1:
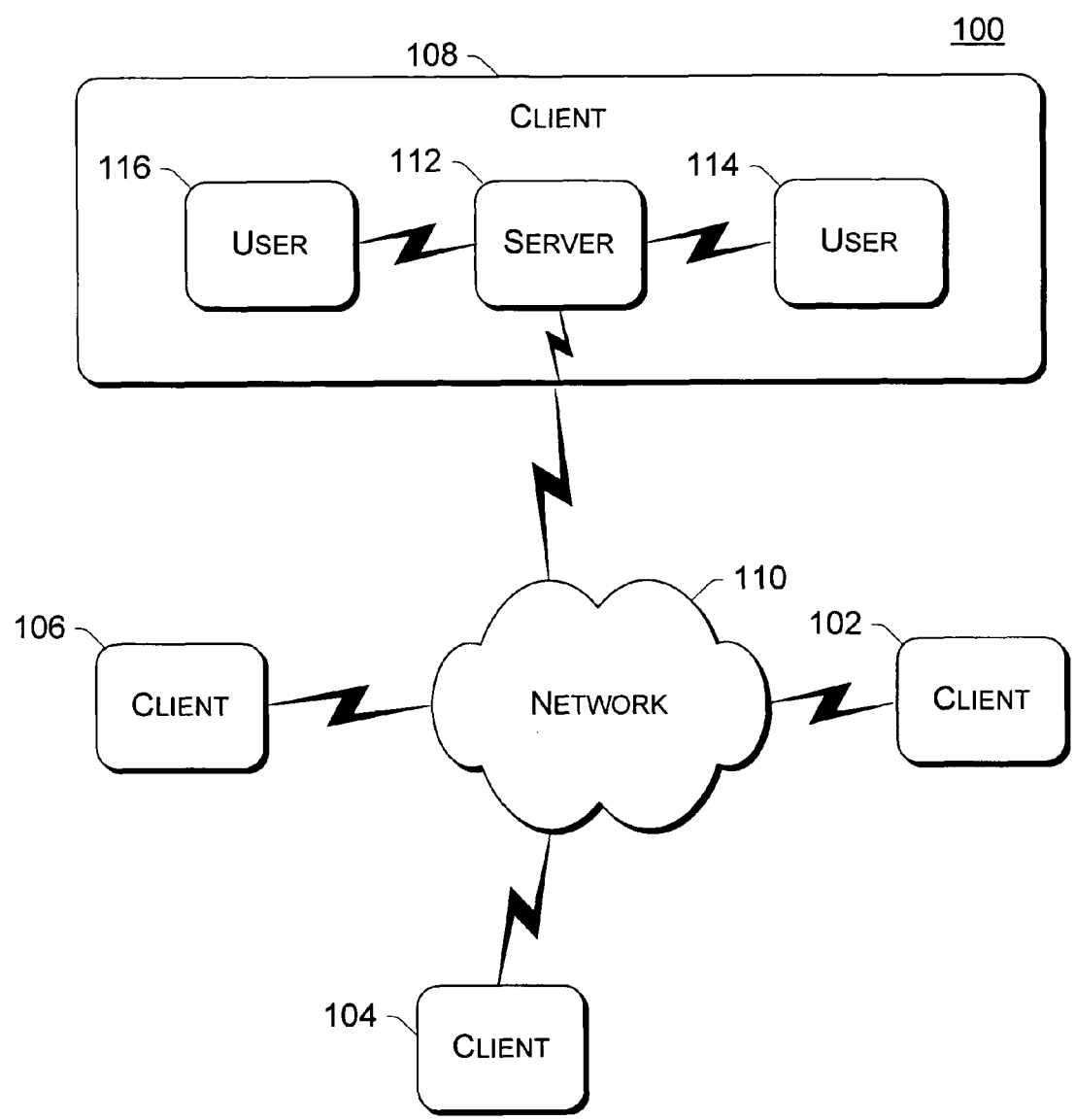
FIG. 1 illustrates an exemplary environment suitable for the concepts of the present disclosure.
Figure 8:
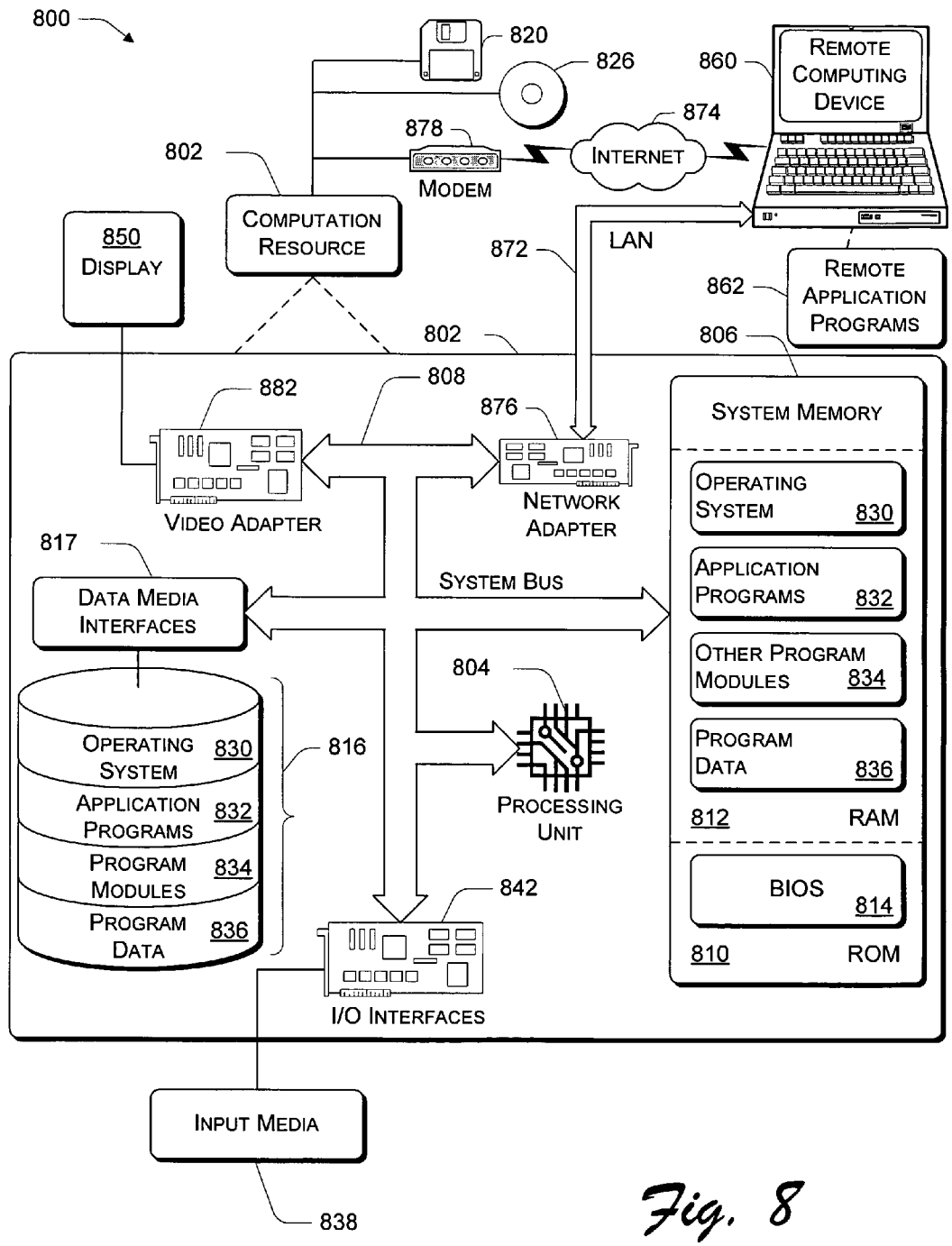

FIG. 8 illustrates an example of a general computer environment useful in the context of the environment of FIG. 1.

DETAILED DESCRIPTION

Introduction.

Prior to describing several embodiments illustrating how improved access to datastores, e.g., Internet pages, may be implemented, the following section addresses an exemplary environment in which such technology finds utility. The discussion of the environment provides a framework within which various elements of the improved information distribution technology can be developed. It will be understood that the navigation approaches described herein find utility in various contexts, such as within a datastore accessed by or within a computer via an operating system, although the description is largely in terms of web site datastore accession and traversal.

Environment.

FIG. 1 illustrates an exemplary environment 100 suitable for implementation of the presently-disclosed concepts. The environment 100 is represented by clients, e.g., clients 102, 104, 106 and 108, interconnected via a network 110, such as the Internet, a LAN, a WAN etc. In the context of this disclosure, a client 102, 104, 106 or 108 may be a user, a web site programmer or an entity, such as a vendor or other party, having a web site for promoting interactions with one or more users.

Each client may include a server, such as server 112 shown in association with client 108, coupled to users 114, 116. It will be appreciated that while only four clients 102, 104, 106 and 108, one server 112 and two users 114, 116 are depicted for simplicity of illustration and ease of understanding, more or fewer of each may be interconnected. In the environment 100, a user may access information such as web pages. Web pages may, for example, form a web site describing goods or services available from a vendor at a given point in time.

Typically, interconnections may employ TCP/IP for effectuating data and message routing and communication, and may facilitate connection to remote devices (e.g., web sites, other computer systems and the like) using IP (internet protocol) addresses, URIs (universal resource identifiers) and/or URLs (universal resource locators).

It will be appreciated that the network connections shown are illustrative and other techniques for establishing a communications link between the computers can be used. The existence of any of various well-known protocols such as TCP/IP, Ethernet, FTP, HTTP, WAP, WAE and the like is presumed, and the system can be operated in a client-server configuration to permit a user to retrieve web pages from a web-based server. Any of various conventional web browsers can be used to display and manipulate data on web pages.

Using an adaptive formatting image control scheme, web designers may design web pages that properly fit within the image area of the display screen of the client device. The control method may be implemented in the form of a web development application.

Web pages are built using toolkits such as the ASP.NET or Mobile Internet Toolkit, both available from the Microsoft Corporation of Redmond, Wash., which allows ASP.NET developers to create mobile web applications. Using these types of toolkits, the web page developer may select the web site content. In the course of such selection, the developer may choose to incorporate audio clips, textual content, and images including company logos, photographs, graphic images or any other image-based or multimedia data.

Having selected images for incorporation into the web site, adaptive formatting image control may be utilized to designate conversion characteristics for generating an image suitable for rendering on multiple client devices. The conversion characteristics may be selected to control scaling of the image. Scaling may be accomplished based on a percentage of the output screen width, height, or both. Scaling may also be performed to maintain the relative size of the source image and/or whether the aspect ratio of the image should be maintained. The position and orientation of the image may also be selected. The conversion characteristics may specify the location of the image relative to a portion of the display. For example, if the image is a banner and the user wishes to have the image displayed at the very top of the image area for each display device, that location can be specified for the image file containing the banner.

Each web site may include hundreds or thousands of pages, and the contents of these web pages or the number of web pages comprising each web site may change over time as the vendor changes inventory, adds or deletes specific supplier alliances and the like.

Figure 2:
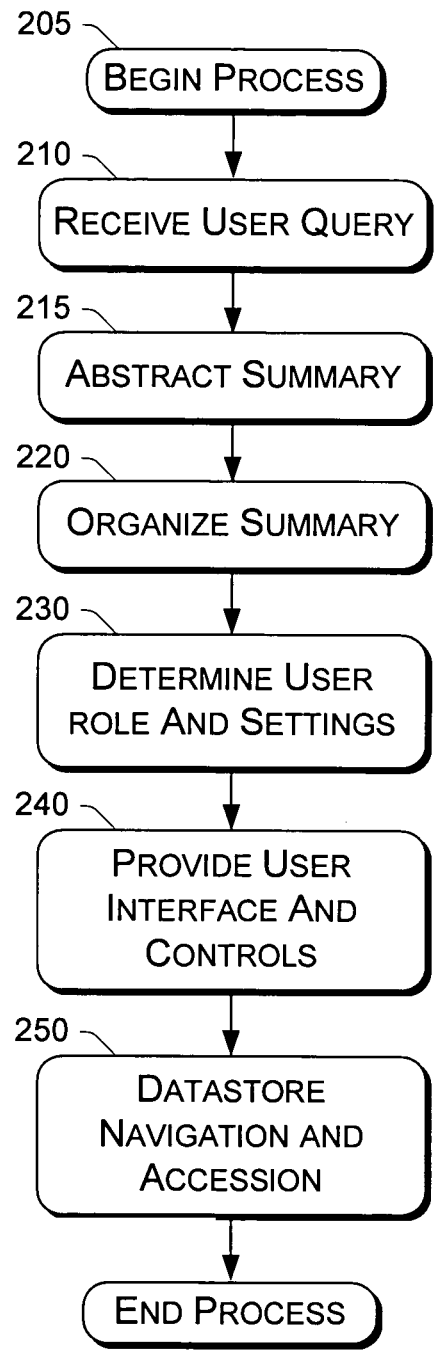
FIG. 2 is a flowchart of a process for hierarchical navigation of one or more datastores.

FIG. 2 is a flowchart describing a process for hierarchical organization and navigation of one or more datastores, while FIGS. 3A, 3B and 4-7 below provide examples of graphical user interfaces. It will be appreciated that these may be customized, for example in the textual portion of the information returned from the datastore, via localization mechanisms configured to be responsive to culture, language and/or locale of a user or a piece of executing code.

Typically, a user 108 navigates a distributed information system via a SiteMapPath control, also known as a Bread-Crumb or EyeBrow control, which also finds utility in the context of the present disclosure. Such controls are often used on sites that contain a relatively large number of logical levels that group pages on the site.

Process

FIG. 2 is a flowchart of a process for hierarchical navigation of one or more datastores. The process 200 begins in a block 205.

In the block 205, a server receives a user request or query. The user query indicates a topic, organization name or provides some other basis for identification of an area or topic of interest.

In a block 210, the process 200 identifies one or more datastores having a relationship to the query. The datastores may represent one or more databases, company catalogs or other bodies of information, and may represent multiple linked datastores.

In a block 215, the process 200 abstracts a summary, analogous to a table of contents, from one or more bodies of the bodies of information selected based on the query. Abstracting a summary may include selecting one or more universal resource locators based on the query.

In a block 220, the process 200 organizes the summary according to an hierarchy of nodes referenced in the one or more bodies of information. This may be organized into a single and seamless set of navigational information to assist developers and/or users in traversing the datastore(s) and accessing portions thereof.

In a block 230, the process 200 determines a user role, user preferences and also a user type and accession permission level. For example, a user may have a limited capacity for information display, as with some types of mobile units (e.g., cellular telephones), may have a chosen set of preferences for types of displays such as are shown in FIGS. 3A, 3B and 4-7. A user may be a system administrator or a web site developer, and thus have a broader range of permissions as well as a need to view information not relevant to other types of users.

Other types of user preferences or needs may be used for customizing textual portions of information returned from the bodies of information via localization mechanisms configured to be responsive to culture, language or locale of a user, or a piece of executing code.

In a block 240, the process 200 provides navigation path controls via a suitable user interface. This may include providing the user controls according to where the user is classified in a predetermined role-based access list. This may also include selecting a graphical user interface chosen from a group consisting of: tree view, SiteMapPath, SiteMapDataSource or menu control, or may include selecting a graphical user interface useful for a mobile device, for example configuring the hierarchy of nodes to be rendered as a set of links coupled with user controls for accession/traversal of nodes in the hierarchy. The process 200 then ends.

Figure 3A:
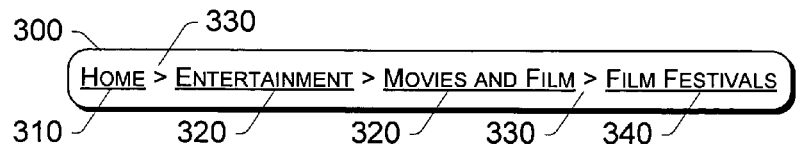
FIG. 3A shows an exemplary graphical user interface text box of an hierarchical navigation path control.

An example of such a navigation path control, displayed via a graphical user interface text box 300, is shown in FIG. 3A. The SiteMapPath control renders a user interface or UI that shows the path to the current page. The navigation path control shows a root node 310, several parent nodes 320, one or more separators 330, and a current node 340.

Although the current implementation of site navigation is described in the context of working with web pages, the concepts described in this disclosure also provide benefits in non-web environments. For example, some of these features have been employed in other environs, including console applications, Winforms applications and NT services. The Site Navigation concepts described herein may be extended to provide functionality into numerous, non-ASP.NET host environment. The site navigation features facilitate accurate representation of, and thus accession and/or traversal of, the structure of evolving datastore content, without necessitating user intervention and/or custom coding.

The present disclosure provides ways to abstract data from a variety of sources, or datastores, which may include multiple linked datastores, databases or other sets of information or sources of information. The present disclosure also provides ways to organize those abstracted data as a single and seamless set of navigational information that is then available to developers and to provide controls for users, without requiring specially-written programs that are specific to those data sources, using formats that are intuitive and uniformly displayed. This facilitates accession and traversal of such navigation data in a fashion that gracefully and transparently accommodates revisions to the underlying data.

The navigation path control may be modified to suit various kinds of needs, promote discrimination between elements and to facilitate rapidly distinguishing one web site from another. For example, control customization may encompass node style property variation, separator character property modification, and separator and item template adaptation.

Exemplary Tools:

Node style properties, such as the appearance of the root 310, parent node(s) 320, path separators 330, and current node 340 appearance style can be set independently. Each style allows a developer to set style properties common to all web controls, such as font styles, background colors, and sizing. Elements within this include the CurrentNodeStyle, which is applied to current node; the NodeStyle, which is applied to all parent nodes; the RootNodeStyle, which is applied to root node; and the PathSeparatorStyle, which is applied to PathSeparator string.

The example below sets the root node 310 to be displayed in a bold blue font, the parent node 320 to be displayed in an unbold blue font, and the current node 340 to be displayed in a red font.

```
<asp:SiteMapPath runat=server RootNodeStyle-Font-Bold="True"
RootNodeStyle-Font-Size="Larger" CurrentNodeStyle-ForeColor=
"Red" />
```

The PathSeparator property can be set to a string value. By default the ">" string, as shown in FIG. 2, is used to separate nodes. The example below resets the path separator to "::".

```
<asp:SiteMapPath runat=server PathSeparator="::" />
```

The path separator template can be used to provide richer rendering between controls. A common scenario where this could potentially be used is for an image. The example below sets the path separator template to be a gif. file, which may be an arrow or other symbol.

```
<asp:SiteMapPath runat=server>
  <PathSeparatorTemplate>
    <asp:Image runat=server ImageUrl="MySeparatorImage.gif" />
  </PathSeparatorTemplate>
</ asp:SiteMapPath >
```

The RootNodeTemplate, CurrentNodeTemplate and NodeTemplate templates can be used to provide custom UIs for each item in the control. This allows web site developers to take advantage of the control's ability to automatically bind to the SiteMap data. The NodeTemplate is used for any node in the path, and will be overridden by the Root and/or Current templates, if defined. Any common template events will be supported on these templates.

When a URL property has been set for a given node, that node will be displayed as a link by default. The RenderCurrentNodeAsLink property can be used to control how the current node appears. By default, this property is set to false. The example below resets this property to "true".

```
<asp:SiteMapPath runat=server RenderCurrentNodeAsLink="true" />
```

A web site developer may wish to configure the direction in which the nodes appear. Two options for PathDirection are RootToCurrent, and CurrentToRoot. The example below reverses the order in which the current node 340, the parent nodes 320 and the root node 310 are displayed in FIG. 3A.

```
<asp:SiteMapPath runat=server PathDirection=
"CurrentToRoot"
PathSeparator="<-" />
```

Figure 3B:
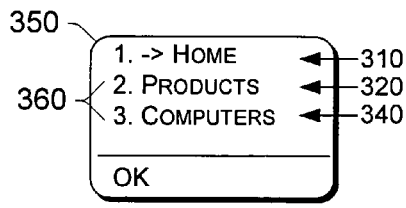
FIG. 3B shows an exemplary screen shot of a mobile device rendering of hierarchical navigation controls.

The SiteMapPath control supports mobile rendering, that is, display on mobile equipment such as cellular telephones having graphics/text display capability and that are equipped to access distributed computer systems. An exemplary screen shot 350 of such rendering is shown in FIG. 3B.

A conventional Wireless Application Protocol (WAP) has been previously developed to deal with severe constraints imposed on mobile stations such as cellular telephones, in order to promote mobile web access. In accordance with WAP, resources retrieved from the Internet are encoded by a gateway server into a compact binary format (e.g., Wireless Markup Language (WML), or WMLScript) and the mobile station, more particularly, the user agent of the mobile station, decodes the bytecodes for presentation to the user. In the case of WML devices, the nodes 340, 320, 310 are rendered as a set of links 350.

The ParentLevelsDisplayed property is used to specify how many nodes will be displayed above the current node. For example, if this is set to 1, then only the parent of the current node will be displayed.

<asp:SiteMapPath runat=server ParentLevelsDisplayed= "1" />

The SiteMapPath control consumes a default SiteMap object associated with the current page. A user may wish to bind to an alternate SiteMapProvider. To do so, a SiteMapProvider must be configured in Web.config, and the SiteMapProvider property of the control should be set accordingly.

```
<asp:SiteMapPath                                runat=server
   SiteMapProvider="MyCustomProvider" />
```

A SiteMapDataSource implements an IHierarchicalDataSource. This is an interface that declares support for binding to and traversing hierarchical data abstracted from one or more datastores. By default, the SiteMapDataSource will bind to the current SiteMap object, allowing site developers to easily bind any databound control to the SiteMap data without the need for specially-written computer code.

```
<asp:SiteMapDataSource runat=server id=MyDataSource />
<asp:TreeView runat=server DataSourceID="MyDataSource" />
```

This SiteMapDataSource also allows developers to bind to alternate SiteMapProviders, and permits factoring the SiteMap data to a specific control tree.

Provider property—allows a developer to determine or set the Provider that is to be used as a source for the SiteMap data. By default, the provider property is not set, and the current SiteMap object is used.

```
<asp:SiteMapDataSource      runat=server     id=MyDataSource
Provider="MyCustomProvider" />
```

In some or many cases, a web site developer will not want to expose all of the SiteMap data via a single user control. The SiteMapDataSource allows the web site developer to specify which node in the SiteMapTree should be used as the root 310 for the DataSource. This may be specified in absolute terms using an absolute URL, or, alternatively, a path that relates to the current page.

ShowStartingNode—indicates whether or not the first piece of navigation data retrieved from the underlying site data should be returned by the data source control. This may be used when it is undesirable to have a root node illustrated in user interfaces.

SiteMapProvider—allows a developer to override the default binding to the default set of site map data, and to instead retrieve navigation data from an alternate provider.

StartFromCurrentNode—when set to true, this indicates that the SiteMapDataSource control will look for a piece of navigational data in the underlying set of data that corresponds to the current page that the user is reviewing. Assuming this piece of data exists, the data source will return one or more nodes, starting at that point.

StartingNodeUrl—allows a developer to provider a string representation of a Url to the data source. The SiteMapDataSource then looks for a matching piece of navigation data in the underlying data store for site navigation data. This allows a developer to have the site map data source start at any arbitrary location with the site navigation data.

StartingNodeOffset—Allows a developer to have the site map data source adjust where it starts returning nodes from the underlying set of site navigation data.

A developer first indicates a "zero-point" in the site navigation data using StartFromCurrentNode, or StartingNodeUrl, or the employs a default by starting at the root node 310 of the overall set of navigation data. Once this point is established, a developer can further refine the starting location by adjusting the staring location "up" or "down" the site navigation data tree. This is useful for scenarios where it is desirable to display navigation data starting, for example, one level above a current location within a website's navigation structure.

EXAMPLE E.1

No Code Binding To Site Navigation

A developer wishes to add a control that will show where a given page is found in the site hierarchy. He has already created a simple Web.sitemap file which describes the relationship between pages on the site. By adding a SiteMapPath control to his page, the site navigation data is automatically found and configured for use. There is no need to add a SiteMapDataSource control because the default behavior of the SiteMapPath works as expected.

```
Web.sitemap
<siteMap>
    <siteMapNode title="Home" description="Home" url="default.aspx" >
        <siteMapNode title="About Us" description="About Us" url="about.aspx"/>
        <siteMapNode title="Products" description="Products" url="Products.aspx">
            <siteMapNode title="Computers" url="Computers.aspx">
            <siteMapNode title="Dell" description="Dell" url="Dell.aspx"/>
            </siteMapNode>
            <siteMapNode title="Cameras" url=" Cameras.aspx">
            <siteMapNode title="Sony" description="Sony" url="Sony.aspx"/>
            </siteMapNode>
        </siteMapNode>
    </siteMapNode>
</siteMap>
Sony.aspx
<%@ Page Language="C#" %>
<html>
<body>
    <form runat="server">
        <asp:SiteMapPath runat=server />
    </form>
</body>
</html>
```

An example of such a web page graphical user interface or GUI 400 is shown in FIG. 4A. The web page 400 facilitates interaction of a user (e.g., such as one of clients 102, 104, 106, 108 of FIG. 1) with web pages created via the process 300 of FIG. 3A. The GUI 400 generally includes a master command bar 405, a control bar 410 having multiple user buttons 415, an address bar 420 and a text/image display space 425. The GUI 400 also includes text blocks such as are shown in master command bar 405, address bar 420 and content 430, text in this example, in the text/image display space 425. Generating the GUI 400 generally involves creation of control elements, such as controls 415 in control bar 410.

In the GUI 400 of FIG. 4A, the master command bar 405 and control bar 410 are typically features of the application being used to browse the content. The content 430 under the address bar 420 is produced by the developer using the disclosed concepts to create controls and to utilize/provide site navigation features.

EXAMPLE E.2

Customizing SiteMapPath Control

A site developer has used the SiteMapPath control and likes its rendering behavior. However she wishes to match the look and feel of the control with the rest of her site. She is able to set logical properties on the control to control the rendering style.

"Home" in bold, italicized green letters, a first parent node 320 labeled "Products" and a second parent node 320 labeled "computers" in plain green letters and a current node 340 labeled "Dell" in orange letters.

EXAMPLE E.3

Binding TreeView to SiteMap data

A web site developer wishes to use a tree-view control to display a site's structure in a tree view 530 (FIG. 5, infra). The developer adds a SiteMapDataSource control to the page, and configures a TreeView to bind to the SiteMap datasource. The additional control is able to render hierarchical data which is provided for it via the standardized site navigation constructs. The TreeView is then able to render the NavigationData in a rich fashion.

The TreeView is able to render the navigation data as a tree extending from the root node 310 and branching out via parent nodes 320 to the current node 340 by consuming hierarchical data abstracted from one or more datastores. The SiteMapDataSource control then exposes navigation data to the user as a hierarchical set of linked nodes. The TreeView control is able to iterate through such a hierarchy, recursing into branches, sub-branches, sub-sub-branches, etc., rendering an arbitrary depth of navigational data. The SiteMapDataSource sits on top of the SiteNavigation infrastructure, allowing a developer to expose non-hierarchical data formats (e.g.

```
Web.sitemap
<siteMap>
    <siteMapNode title="Home" description="Home" url="default.aspx" >
        <siteMapNode title="About Us" description="About Us" url="about.aspx"/>
        <siteMapNode title="Products" description="Products" url="Products.aspx" >
            <siteMapNode title="Computers" url="Computers.aspx">
            <siteMapNode title="Dell" description="Dell" url="Dell.aspx"/>
            </siteMapNode>
            <siteMapNode title="Cameras" url=" Cameras.aspx">
            <siteMapNode title="Sony" description="Sony" url="Sony.aspx"/>
            </siteMapNode>
        </siteMapNode>
    </siteMapNode>
</siteMap>
Dell.aspx
<%@ Page Language="C#" %>
<html>
<body>
    <form runat="server">
        <asp:SiteMapPath runat=server RootNodeStyle -Font-Bold="true"
            RootNodeStyle -Font-Names="Arial Black" RootNodeStyle -Font-Italic="True"
            RootNodeStyle-ForeColor="Green" NodeStyle-ForeColor="Green"
            CurrentNodeStyle-ForeColor="Orange"
```

In this example, the graphical user interface 400 of FIG. 4B contains the master command bar 405, but displaying the URL "aspx.dell", the address bar 420 displays a URI "dell.aspx" and the text block 430 displays a root node 310 labeled flat file formats, relation data in a database that normally is not hierarchical, etc.) in a hierarchical fashion for consumption by a control, such as the TreeView control.

Web.sitemap

```
<siteMap>
    <siteMapNode title="Home" description="Home" url="default.aspx" >
        <siteMapNode title="About Us" description="About Us" url="about.aspx"/>
        <siteMapNode title="Products" description="Products" url="Products.aspx">
            <siteMapNode title="Computers" url="Computers.aspx">
            <siteMapNode title="Dell" description="Dell" url="Dell aspx"/>
            </siteMapNode>
            <siteMapNode title="Cameras" url=" Cameras.aspx">
```

```
            <siteMapNode title="Sony" description="Sony" url="Sony.aspx"/>
          </siteMapNode>
        </siteMapNode>
      </siteMapNode>
    </siteMap>
Dell.aspx
<%@ Page Language="C#" %>
<html>
<body>
    <form runat="server">
      <asp:SiteMapDataSource runat=server id=MyDataSource/>
      <asp:TreeView runat=server DataSourceId="MyDataSource />
    </form>
</body>
</html>
/>
      </form>
  </body>
  </html>
```

FIG. 5 shows an example of a web page graphical user interface or GUI 500 rendered via the approach of Example E.3. The GUI 500 facilitates interaction of a user (e.g., such as one of clients 102, 104, 106, 108 of FIG. 1) with web pages created via the process 200 of FIG. 2 in accordance with the example. The GUI 500 generally includes the master command bar 405, control bar 410 having multiple user buttons 415, address bar 420 and text/image display space 425, as shown in FIGS. 4A and 4B. However, content space 525 provides content 530 in the form of a tree view of the information being accessed/traversed by the user, instead of the displays of FIGS. 4A and 4B. The content 530 under the address bar 420 is produced by the developer using the disclosed concepts to create controls and to utilize/provide site navigation features.

EXAMPLE E.4

Factoring SiteMap Data Using SiteMapDataSource control

A site developer wishes to databind a TreeView to the SiteMapData. His Web.sitemap file contains a large number of nodes, and only a subset of the nodes should be displayed at any given time. By setting a few properties on the SiteMapDataSource, the developer is able to limit the amount of information which is returned.
Web.sitemap

```
<siteMap>
    <siteMapNode title="Home" description="Home" url="default.aspx" >
        <siteMapNode title="About Us" description="About Us" url="about.aspx"/>
        <siteMapNode title="Products" description="Products" url="Products.aspx" >
          <siteMapNode title="Computers" url="Computers.aspx">
          <siteMapNode title="Dell" url="Dell.aspx"/>
          <siteMapNode title="HP" url="HP.aspx"/>
          <siteMapNode title="Compaq" url="Compaq.aspx"/>
          <siteMapNode title="Gateway" url="Gateway.aspx"/>
          </siteMapNode>
          <siteMapNode title="Cameras" url=" Cameras.aspx">
          <siteMapNode title="Sony" description="Sony"
              url="Sony.aspx"/>
          </siteMapNode>
        </siteMapNode>
    </siteMapNode>
</siteMap>
```

```
Dell.aspx
<%@ Page Language="C#" %>
<html>
<body>
    <form runat="server">
      <asp:SiteMapDataSource runat=server id=MyDataSource
          StartingNodeUrl="Computers.aspx"
      />
      <asp:TreeView runat=server DataSourceId="MyDataSource />
    </form>
</body>
</html>
```

FIG. 6 shows an example of a web page graphical user interface or GUI 600 rendered via the approach of Example E.4. The GUI 600 facilitates user interaction with web pages created via the process 200 of FIG. 2 in accordance with the example. The GUI 600 generally includes the master command bar 405, control bar 410 having multiple user buttons 415 and address bar 420, as shown in FIGS. 4A and 4B. However, content space 625 provides content 630 in the form of a tree view of a limited amount of the information being accessed/traversed by the user, in this example, one parent node 635 and four sibling child nodes 640, instead of the display of FIG. 5, which includes more parent and child nodes.

EXAMPLE E.5

Binding Non-Hierarchal Controls to Navigation Data

A site developer wishes to bind a custom Data-Bound control to the navigation data. The custom control does not understand hierarchal data, but is able to render information stored in a tabular fashion. A NavigationDataSource control can return data in a format appropriate to the control. In addition the SiteMapDataSource can be configured to flatten the Hierarchical data in a sensible fashion for the DataBound control.
Web.sitemap

```
<siteMap>
    <siteMapNode title="Home" description="Home" url="default.aspx" >
        <siteMapNode title="About Us" description="About Us" url="about.aspx"/>
        <siteMapNode title="Products" description="Products"
```

-continued

```
        url="Products.aspx"
>
        <siteMapNode title="Computers" url="Computers.aspx">
        <siteMapNode title="Dell" url="Dell.aspx"/>
        <siteMapNode title="HP" url="HP.aspx"/>
        <siteMapNode title="Compaq" url="Compaq.aspx"/>
        <siteMapNode title="Gateway" url="Gateway.aspx"/>
        </siteMapNode>
        <siteMapNode title="Cameras" url=" Cameras.aspx">
            <siteMapNode  title="Sony"  description="Sony"
url="Sony.aspx"/>
        </siteMapNode>
      </siteMapNode>
  </siteMapNode>
</siteMap>
Dell.aspx
<%@ Page Language="C#" %>
<html>
<body>
   <form runat="server">
   <asp:SiteMapDataSource runat=server id=MyDataSource
        StartingNodeUrl="Computers.aspx"
       />
       <asp:MyCustomDataControl runat=server DataSourceId=
       "MyDataSource />
   </form>
</body>
</html>
```

In this example, the GUI 700 of FIG. 7 includes a vertical scroll bar 702, instead of the text block 430 of FIGS. 4A and 4B. The vertical scroll bar 702 shows a selected option 705, "Dell" in this example, and provides options via a control button 710, amongst options 715, labeled "Dell", "HP", "Compaq" and "Gateway" in this example. The address control bar 420 displays a different legend than that of FIG. 4A or 4B, in this example, "http://localhost:8080/teste.aspx".

EXAMPLE E.6

Accessibility Skip Functionality

When web pages include larger amounts of repetitive content (which a screen reader would see or read every time the page is accessed), it can be helpful to provide tools whereby users are able to skip repetition of this content. One conventional way to achieve this functionality is to render an "invisible gif" with Alt Text giving the user the option to jump to the end of the content. This permits screen readers pick up the alt text and read it, but the image does not disturb the visual flow of the page.

To implement this functionality within the ambit of this disclosure, the SiteMapPath control provides a way for the entire control to be skipped. As a result, the screen reader won't have to read all of the links in the list before reading the rest of the page. The default value of SkipToContentText=Skip Navigation Links. The SiteMapPath contains a SkipToContentText property.

When SkipToContentText has a value, then the following markup is rendered for desktop browsers:

```
        <a href="#AfterSiteMapPath_ct100_SiteMapPath1">
        <img alt="Skip Navigation Links"
        height="0"
        width="0"
        border="0"
        src="WebResource.axd?a=s&r=Spacer.gif&
        t=632181709896257576" />
        </a>
```

This anchor bookmark is generated after the repeating content:

```
        <a name="AfterSiteMapPath_ct100_SiteMapPath1">
        </a>
```

When SkipToContentText is null or empty, no additional mark-up is generated.

Computer System.

FIG. 8 is a block diagram of a computer system 800 applicable to the context of the present disclosure, which is provided, in part, in the general context of computer-executable instructions, such as program modules, executed by one or more computers or other devices. Generally, program modules include routines, programs, objects, components, data structures etc. that perform particular tasks or implement particular abstract data types. Typically, the functionality of the program modules may be combined or distributed as desired in various embodiments.

The concepts disclosed herein may be implemented in hardware or a combination of hardware, software, and/or firmware. For example, one or more application specific integrated circuits (ASICs) could be designed or programmed to embody the concepts disclosed herein.

FIG. 8 illustrates an example of a general computer environment 800 useful in the context of the environment of FIG. 1 and/or with aspects of the present disclosure described above with reference to FIGS. 2-5. The illustrated operating environment is only one example of a suitable operating environment and is not intended to suggest any limitation as to the scope of use or functionality of the embodiments of this disclosure. Other well-known computing systems, environments, and/or configurations may be suitable for implementation of the disclosure.

FIG. 8 depicts a general example of a computation resource 802 that can be used to implement the processes described herein. The computation resource 802 is shown as an example of a computer in which various embodiments of these processes can be practiced. The computation resource 802 is illustrated as only an example of a computing device that may be used with the invention; other devices may alternatively used that include more components or alternatively fewer components than those illustrated in FIG. 8.

The computation resource 802 includes one or more processors or processing units 804, a system memory 806, and a bus 808 that couples various system components including the system memory 806 to processor(s) 804. The bus 808 represents one or more of any of several types of bus structures, including a memory bus or memory controller, a peripheral bus, an accelerated graphics port and a processor or local bus using any of a variety of bus architectures.

The system memory 806 includes nonvolatile read only memory (ROM) 810 and random access memory (RAM) 812, which may or may not be a volatile memory. A basic input/output system (BIOS) 814, containing the basic routines that help to transfer information between elements within computation resource 802, such as during start-up, is stored in ROM 810.

The computation resource 802 further may include a hard disk drive 816 for reading from and writing to a hard disk, not shown, coupled to bus 808 via a data media interface 817 (e.g., a SCSI, ATA, or other type of interface); a magnetic disk drive (not shown) for reading from and writing to a removable magnetic disk 820 and an optical disk drive (not shown) for reading from and/or writing to a removable optical disk 826 such as a compact disc or CD, DVD, or other optical media.

The hard disk drive 816, magnetic disk drive and/or optical disk drive are each coupled to the system bus 808 by one or more data media interfaces 817. Alternatively, the hard disk drive 816, magnetic disk drive and/or optical disk drive can be coupled to the system bus 808 by one or more interfaces (not shown).

The drives and their associated computer-readable media provide nonvolatile storage of computer readable instructions, data structures, program modules and other data for the computation resource 802. Although the exemplary environment is described herein as employing a hard disk drive 816, a removable magnetic disk 820 and a removable optical disk 826, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 816, magnetic disk 820, optical disk 826, ROM 810, or RAM 812, including an operating system 830, one or more application programs 832, other program modules 834 and program data 836. A user may enter commands and information into computation resource 802 through input devices such as input media 838 (e.g., keyboard/keypad, tactile input or pointing device, joystick, touchscreen or touchpad, microphone, antenna etc.). Such input devices 838 are coupled to the processing unit 804 through an input/output interface 842 that is coupled to the system bus (e.g., a serial port interface, a parallel port interface, a universal serial bus (USB) interface, an IEEE 1354 (Firewire) interface, etc.). A monitor 850 or other type of display device is also coupled to the system bus 808 via an interface, such as a video adapter 852.

The computation resource 802 may include capability for operating in a networked environment using logical connections to one or more remote computers, such as a remote computer 860. The remote computer 860 may be a personal computer, a server, a router, a network PC, a peer device or other common network node, and typically includes many or all of the elements described above relative to the computation resource 802. In a networked environment, such as that illustrated with computing environment 800, program modules depicted relative to the computation resource 802, or portions thereof, may be stored in a remote memory storage device.

By way of example, remote application programs 862 reside on a memory device of the remote computer 860. The logical connections represented in FIG. 8 may include a local area network (LAN) 872 and/or a wide area network (WAN) 874, but may also include other networks. Such networking environments are commonplace in offices, enterprise-wide computer networks, intranets and the Internet.

Such networking environments are commonplace in modern computer networks, and in association with intranets and the Internet. In certain embodiments, the computation resource 802 executes an Internet Web browser program (which may optionally be integrated into the operating system 830) such as the "Internet Explorer" Web browser manufactured and distributed by the Microsoft Corporation of Redmond, Wash.

When used in a LAN networking environment, the computation resource 802 is coupled to a network such as the local area network 872 through a network interface or adapter 876. When used in a WAN networking environment, the computation resource 802 typically includes interfaces such as a modem 878 or other means for establishing communications over the wide area network 874, such as the Internet. The modem 878, which may be internal or external, is coupled to the system bus 808 via a serial port interface.

In a networked environment, program modules depicted relative to the computation resource 802, or portions thereof, may be stored in the remote memory storage device. It will be appreciated that the network connections shown are exemplary and other means of establishing a communications link between the computers may be used. A user 102, 104, 106, 108 (FIG. 1) using a computer may operate in a networked environment 100 using logical connections to one or more remote computers, such as a remote computer, which may be a personal computer, a server, a router, a network PC, a peer device or other common network node, and which typically includes many or all of the elements described above relative to the computer 800 of FIG. 8, although only some examples of memory storage devices are illustrated in FIG. 8.

The computation resource 802 typically includes at least some form of computer readable media. Computer readable media can be any available media that can be accessed by the computation resource 802. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the computation resource 802.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

Conclusion

By now it will be appreciated that the present disclosure contemplates a methodology and system that promotes distributed computer system information accession and modification. While accessing and presenting site navigation data is common to most websites, increasing the capability to provide a standard, yet extensible, out-of-box implementation for accessing and displaying site navigation data adds substantial value to the web sites, e.g., via the ASP.NET platform. The extensible nature of the disclosed Site Navigation system enables third-party developers to create custom navigation data stores that can seamlessly integrate with ASP.NET pages/controls authored against the Site Navigation API.

The present disclosure also facilitates exposing navigation information through a set of classes that allow developers to provide their own logic and UI using the services of the classes. The classes provide functionality for interacting with the navigational data in an abstract fashion.

Other product developments from the Microsoft Corporation of Redmond, Wash., include display and content management features that interact cooperatively with the ASP.NET Site Navigation APIs. This provides a consistent programming model for site navigation data across the breadth of the Microsoft Corporation's web-base tools.

Although the description above uses language that is specific to structural features and/or methodological acts, it is to be understood that the recitation of the appended claims is not limited to the specific features or acts described. Rather, the specific features and acts are disclosed as exemplary forms of implementing these concepts.

What is claimed is:

1. A process for hierarchically organizing bodies of information comprising:

receiving a query from a user, wherein the query indicates an area of interest, wherein the area of interest is a topic specified by the user;

identifying one or more datastores having a relationship to the query;

automatically abstracting a summary of information related to the area of interest from the one or more identified datastores identified based on the query;

organizing the summary of information related to the area of interest according to an hierarchy of nodes, wherein the hierarchy of nodes references at least one body of information based on the query;

determining user preferences, wherein the user preferences indicate that the user is operating a mobile unit and that the mobile unit is in a specific locale; and providing information configured to facilitate displaying a graphical user interface based on the area of interest illustrating the hierarchy and having user controls for accession of nodes in the hierarchy, wherein the graphical user interface customizes textual portions of the interface based upon the user preferences such that the textual portions are appropriate for the mobile unit and the locale of the mobile unit.

2. The process of claim 1, wherein abstracting comprises abstracting from multiple linked datastores, and further comprising providing information from these multiple linked datastores as a single and seamless set of navigational information to developers and controls for users.

3. The process of claim 1, wherein abstracting a summary of information related to the area of interest comprises abstracting a table of contents.

4. The process of claim 1, further comprising customizing textual portions of information returned from the bodies of information via localization mechanisms configured to be responsive to culture, language or locale of a user, or a piece of executing code.

5. The process of claim 1, further comprising providing the user controls according to where the user is classified in a predetermined role-based access list.

6. The process of claim 1, wherein abstracting comprises selecting one or more universal resource locators based on the query.

7. The process of claim 1, wherein the graphical user interface includes one or more controls for user selection among displays chosen from a group comprising: tree view, SiteMapPath, SiteMapDataSource and menu control.

8. The process of claim 1, wherein providing information comprises providing information configured to facilitate displaying a graphical user interface via a mobile device that is capable of facilitating illustrating the hierarchy via nodes rendered as a set of links coupled with user controls for accession/traversal of nodes in the hierarchy.

9. The process of claim 1, wherein abstracting a summary of information related to the area of interest from one or more bodies of the bodies of information selected based on the query comprises abstracting a summary from one or more bodies of information stored in a memory coupled to a computer.

10. A computer storage medium encoding computer readable instructions configured to cause one or more processors to construct and provide navigational controls for a user of a distributed computer system, wherein the instructions are configured to cause the one or more processors to:

determine user preferences, wherein the user preferences indicate that the user is operating a mobile unit in a locale;

instantiate an hierarchical site map as a user interface in response to a user query indicating an area of interest, wherein the site map provides data abstractions conditioned for human intelligibility and references associated computer-intelligible data, and wherein the area of interest is a topic specified by the user;

receive user input via the user interface; and respond to the user input by identifying one or more datastores having a relationship to the user query indicating an area of interest, automatically abstracting a summary of information related to the area of interest from the one or more identified datastores identified based on the user query, and providing content based on the area of interest as indicated by the query via the user interface, wherein textual portions of the content is presented via the user interface in a manner according to the user preferences such that the content is presented in a format appropriate for the mobile unit and the locale of the unit.

11. The computer storage medium of claim 10, wherein the computer readable instructions are configured to facilitate web site development, and wherein the computer readable instructions are further configured to effectuate a choice of user interfaces chosen from a group comprising of: tree view, SiteMapPath, SiteMapDataSource and menu control.

12. The computer storage medium of claim 10, wherein the computer readable instructions are configured for data store navigation and accession and further include instructions configured to:

abstract a series of nodes including a root node, one or more parent nodes and one or more child nodes from a datastore;

sort the series of nodes in an hierarchy; and provide the hierarchy to the user.

13. The computer storage medium of claim 10, wherein the computer readable instructions configured to cause the one or more processors to provide content include computer readable instructions configured to customize portions of information derived from the data abstractions via localization mechanisms configured to be responsive to culture, language or locale of a user, or a piece of executing code.

14. The computer storage medium of claim 10, further comprising the computer readable instructions configured to cause the one or more processors to provide user controls provide the user controls according to where the user is classified in a predetermined role-based access list.

15. The computer storage medium of claim 10, wherein the computer readable instructions configured to cause one or more processors to instantiate the hierarchical site map comprises computer readable instructions configured to cause one or more processors to select one or more universal resource locators based on the user input.

16. The computer storage medium of claim 10, wherein the computer readable instructions is configured to adapt to modification of a datastore from which the hierarchical site map is abstracted.

17. The computer storage medium of claim 10, wherein the computer readable instructions configured to instantiate the hierarchical site map comprise computer readable instructions configured to provide data abstractions conditioned for human intelligibility and references associated computer-intelligible data stored in a memory that is coupled to a personal computer.

18. A system for navigation of one or more data sources, comprising:
 a processing unit; and
 a memory coupled with and readable by the processing unit and having stored therein instructions which, when executed by the processing unit, cause the processor to perform the following acts:
  identifying one or more data sources having a relationship to a query, wherein the query indicates an area of interest, wherein the area of interest is a topic specified by the user;
  automatically abstracting a summary of information related to the area of interest from the one or more data sources, wherein the summary is a table of contents and includes one or more universal resource locators based on the query;
  providing a hierarchy of nodes referenced in the one or more identified data sources, wherein the hierarchy of nodes is organized into a single set of navigational information;
  determining information related to user role, user preferences, user hierarchy, user type, and accession permission level, wherein the user preferences indicate that the user is operating a mobile unit in a locale;
  providing provide navigation controls according to the information related to the user role, user preferences, user hierarchy, user type, and accession permission level, wherein textual portions of the hierarchy is presented according to the user preferences in a format appropriate for the mobile unit in the locale; and
  facilitating the user in navigating the datastore hierarchy.

19. The system of claim 18, wherein the memory further comprises instructions that cause the processor to perform the act of providing a web site development tool having capacities for organization of dynamically-reconfigurable summaries from the one or more data sources as data contained therein undergoes modification.

20. The system of claim 18, wherein the memory further comprises instructions that cause the processor to perform the act of providing a user interface capable of rendering an hierarchical navigation aid to a user.

21. The system of claim 18, wherein the memory further comprises instructions that cause the processor to perform the act of providing a memory organization, accession and traversal tool for a memory coupled to a computer.

22. The system of claim 18, wherein the memory further comprises instructions that cause the processor to perform the act of providing a user interface capable of rendering an hierarchical navigation aid to a user, the hierarchical navigation aide including localization mechanisms configured to be responsive to culture, language or locale of the user, or a piece of executing code.

23. The system of claim 18, wherein the memory further comprises instructions that cause the processor to perform the act of providing a user interface capable of rendering an hierarchical navigation aid to a user that includes user controls delimited according to where the user is classified in a predetermined role-based access list.

24. A process for deploying a web page, comprising:
 receiving, from a client process, a request for a web page;
 receiving user preferences, wherein the user preferences indicate that the user is operating a mobile unit in a specific locale;
 receiving a user query, wherein the query indicates an area of interest, wherein the area of interest is a topic specified by the user; and
 in response to the query, generating and providing, from a server process, an hierarchical navigation control interface of a summary of information related to the area of interest, wherein the hierarchical navigation control interface of summary information is generated by identifying one or more datastores having a relationship to the user query indicating an area of interest and automatically abstracting a summary of information related to the area of interest from the one or more identified datastores identified based on the user query, and wherein the server process provides textual portions of the summary of information according to user preferences in a format appropriate for the mobile unit and the specific locale.

25. The process of claim 24, wherein providing comprises providing the graphical user interface chosen from a group comprising: tree view, SiteMapPath, SiteMapDataSource and menu control.

26. The process of claim 24, wherein providing comprises providing access to an hierarchy of nodes including one or more parent nodes and at least one child node, the nodes corresponding to different portions of a datastore.

27. The process of claim 24, wherein receiving comprises receiving the request via a graphical user interface of the area of interest chosen from a group comprising: tree view, SiteMapPath, SiteMapDataSource and menu control.

28. The process of claim 24, wherein providing comprises providing portions of the hierarchical navigation control interface of the area of interest via localization mechanisms configured to be adaptive to culture, language or locale of a user.

29. The process of claim 24, wherein providing comprises: providing access to an hierarchy of nodes including one or more parent nodes and at least one child node, the nodes corresponding to different portions of a datastore; and including an element within the hierarchical navigation control that is configured to permit the user to skip portions of the hierarchy.

30. The process of claim 24, wherein providing comprises providing access to an hierarchy of nodes extracted from multiple datastores.

31. The process of claim 24, wherein providing comprises providing access to an hierarchy of nodes including one or more parent nodes and at least one child node in accordance with a role-based accession list.

* * * * *